(12) United States Patent
Albornoz et al.

(10) Patent No.: US 7,502,809 B2
(45) Date of Patent: Mar. 10, 2009

(54) METHOD AND SYSTEM FOR EFFICIENT AND SCALABLE DETECTION AND MANAGEMENT OF GLOBAL ANNOTATIONS

(75) Inventors: Jordi A. Albornoz, Arlington, MA (US); Brian J. Cragun, Rochester, MN (US); Christine A. Grev, Rochester, MN (US); Hoa T. Tran, Rochester, MN (US); David A. Wall, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 501 days.

(21) Appl. No.: 10/965,185

(22) Filed: Oct. 14, 2004

(65) Prior Publication Data

US 2005/0209989 A1 Sep. 22, 2005

Related U.S. Application Data

(63) Continuation-in-part of application No. 10/803,619, filed on Mar. 18, 2004.

(51) Int. Cl.
*G06F 17/30* (2006.01)
(52) U.S. Cl. .................. 707/102; 707/100; 707/103; 707/104.1
(58) Field of Classification Search .............. 707/1, 707/2, 3, 4
See application file for complete search history.

(56) References Cited

U.S. PATENT DOCUMENTS

| | | | |
|---|---|---|---|
| 5,826,025 A * | 10/1998 | Gramlich | 709/217 |
| 6,519,603 B1 | 2/2003 | Bays et al. | |
| 6,877,137 B1 * | 4/2005 | Rivette et al. | 715/230 |
| 7,305,614 B2 * | 12/2007 | Chen et al. | 715/234 |
| 2004/0098362 A1 * | 5/2004 | Gargi | 707/1 |
| 2004/0186817 A1 * | 9/2004 | Thames et al. | 707/1 |
| 2004/0205542 A1 * | 10/2004 | Bargeron et al. | 715/512 |
| 2005/0010562 A1 * | 1/2005 | Nagasaka | 707/3 |
| 2005/0234891 A1 * | 10/2005 | Walther et al. | 707/3 |
| 2005/0256867 A1 * | 11/2005 | Walther et al. | 707/5 |

OTHER PUBLICATIONS

U.S. Appl. No. 10/803,619, "Method and System for Creation and Retrieval of Global Annotations", filed Mar. 18, 2004.
U.S. Appl. No. 10/600,014, "Universal Annotation Management System", filed Jun. 20, 2003.

* cited by examiner

*Primary Examiner*—Apu M Mofiz
*Assistant Examiner*—Mohammad N Rahman
(74) *Attorney, Agent, or Firm*—Patterson & Sheridan, LLC

(57) ABSTRACT

Methods, systems, and articles of manufacture for proving global annotation services are disclosed. Global annotations are used to annotate a data element independently from the internal representation of a data element employed by a particular software application. Data elements are normalized into a form used by a global annotation system to identify the data element, and corresponding global annotations, independent from the application in which the data element may appear. An annotation cache may be used to store the global annotations that have been created for a particular data source, improving the efficiency of the global annotation system.

8 Claims, 10 Drawing Sheets

METHOD AND SYSTEM FOR EFFICIENT AND SCALABLE DETECTION AND MANAGEMENT OF GLOBAL ANNOTATIONS

CROSS-REFERENCE TO RELATED APPLICATIONS

This application is a continuation-in-part of commonly owned, co-pending application Ser. No. 10/803,619 filed on Mar. 18, 2004 entitled "Method and System for Creation and Retrieval of Global Annotations." The present application is related to commonly-owned U.S. Pat. No. 6,519,603, entitled "Method and System for Organizing an Annotation Structure and For Querying Data and Annotations" and commonly owned, co-pending application Ser. No. 10/600,014, entitled "Universal Annotation Management System" which are incorporated herein by reference in their entirety.

BACKGROUND OF THE INVENTION

1. Field of the Invention

The present invention relates to the field of data entry and retrieval. More particularly, the present invention relates to methods and systems for anchoring annotations a data element described by an annotation independently from a data source in which a particular data elements appears.

2. Description of the Related Art

Software applications such as relational databases, text documents, flat files, and the like are well known tools for capturing and storing data and information. Generally software applications store explicit knowledge, i.e., the actual data values obtained from scientific experimentation the contents of a document such as a letter, research paper, spread sheet, database entries, and the like. Often, such data is analyzed by various parties, e.g., experts, technicians, managers, scientists, researchers and the like, resulting in rich interpretive information, commonly referred to as tacit knowledge. Oftentimes however, tacit knowledge is only temporarily captured, e.g., as cryptic notes in a lab notebook, discussions among various parties, presentations, instant-messaging exchanges, emails and the like. Thus, tacit knowledge is often lost, because the application environment in which the related data is viewed and analyzed only captures the explicit knowledge.

One approach to capture tacit knowledge more permanently is to create annotations containing descriptive information about data elements that appear in a data source. Practically any identifiable type of data may be annotated, including spreadsheet content or database tables, a text document, or multimedia files. Further, sub-portions of data may be annotated, such as a cell, row, or column in a database table or a section, paragraph, or word in a text document. An indexing scheme is typically used to map each annotation to the annotated data, based on identifying information stored in an index. An index of annotations should be specific enough to locate the data element stored in a particular data source corresponding to the annotation listed in an index. Further, to be effective, the indexing scheme should function both ways, that is, given an index, the scheme must be able to locate the annotated data and, given a discrete data element, the scheme must be able to calculate an index value used to classify, compare, and search the annotations.

Typically, an index references the particular data source where the data element corresponding to the annotation appears, e.g., a text-document, spreadsheet, database table, and the like. Thus, using the index, an annotation may be retrieved using the application used to manipulate the data source and map the annotation to the annotated content therein. Oftentimes however, an interesting (and therefore likely to be annotated) data element may appear in a variety of application programs. For example, in a biomedical enterprise, a single data element, such as a gene name or locus, may appear in text documents (manipulated by a word processor/text editor), experimental data (manipulated by a database or spreadsheet application), genomic data (manipulated by a specialized application), images (manipulated by an image viewing application), and others. In many cases, an annotation made for the data element may be useful to users viewing the data regardless of the application being used. In such cases, it is desirable to allow the annotation to be "anchored" to the data element such that it capable of being retrieved and viewed from any application used to view data that includes the data element.

Managing annotations created for a data element (referred to herein as "global annotations"), as opposed to annotations created for an instance of the data element in a specific data source (referred to herein as a "document-based annotations"), creates several challenges for an annotation management system. First, although a data element may appear the same to users across a variety of applications—because the data element is meant to impart the same substantive information—different applications use different methods to represent data internally. Thus, to support global annotations, an annotation system should be configured to identify data elements independently from an underlying application type. Also, an annotation system may anchor some annotations to a particular data source. Accordingly, the annotation system (or application) needs to distinguish between annotation types when creating, viewing, accessing, and retrieving global annotations and document-based annotations.

Challenges also arise displaying and processing global annotations. First, annotations created for a particular data element may lose some contextual sensitivity. That is, a data element might be commonplace in one data source and interesting in another. For example, the term "DNA" is likely to be mere background in a paper describing an aspect of gene translation and transcription, but of central importance in a different paper describing biological computing techniques using synthesized DNA sequences to encode data. Also, one data source may contain a significant number of annotated data elements, not all of which may be relevant in context. Displaying annotations, or an indication thereof, for all of the data elements appearing in a particular data source may, therefore, reduce the overall usefulness of the annotation system. Consider an analogy: highlighting an entire page of text subverts the purpose of highlighting: to call attention to interesting sections on the page. Thus, if overused, the presentation may overwhelm the message. Finally, the additional computational overhead required to manage these challenges may decrease the performance of the annotation system below many users' tolerance levels, discouraging them from using the annotation system to capture and retrieve tacit knowledge, in the form of annotations.

Accordingly, there is a need for methods and systems of creating and managing annotations that are anchored to the data elements they describe, such that a contextually meaningful annotation may be retrieved and viewed from any application displaying the corresponding data element. Additionally, such methods and systems should provide for an efficient and scalable annotation system, in order to gain adoption by end users.

SUMMARY OF THE INVENTION

Embodiments of the present invention provide methods, systems, and articles of manufacture for managing global annotations. In one embodiment, the invention provides a method for managing global annotations for data elements present in a data source. The method generally comprises defining a set of data elements for which global annotations may be created, where global annotations are stored by an annotation system independently from a representation used by a software application for a particular data element, identifying the data source accessed by a user, and parsing the data source to identify a set of candidate data elements, wherein each member of the set of candidate data also appears in the set of data elements for which global annotations may be created. Once identified, the method returns an indication of the members of the set of candidate data elements to the software application.

Another embodiment provides a method for accessing global annotations for data elements present in a data source. The method generally includes identifying the data source accessed by a user and identifying a set of annotated data elements, wherein each member of the set of annotated data elements appears in the data source and has at least a corresponding global annotation. The method generally further includes returning an indication of the members of the set of annotated data elements to the software application used by the user to access the data source and providing an indication of the members of the set of annotated data elements in the data source for which there exists a corresponding global annotation to the user.

Another embodiment of the invention provides a system for managing a set of global annotations. Generally, the system includes an annotation database for storing a set of global annotations, wherein each global annotation annotates a data element, and wherein global annotations are stored independently from a representation of a particular data element used by a software application. The system generally further includes a set of plug-in components integrated into the software application, wherein the plug-in components are configured to communicate with the software application and with an annotation server that is configured to communicate with the plug-in components and configured to process requests from the applications to process global annotations and a global annotation cache configured to identify a set global annotations corresponding to data elements in a particular data source.

Another embodiment provides a method for improving the efficiency of a global annotation system. The method generally includes providing an annotation database for storing a set of global annotations, wherein the global annotations annotate a set of data elements and wherein global annotations are stored independently from a representation of a particular data element used by a software application, and providing an annotation cache configured to identify a set of global annotations corresponding to data elements that appear in a particular data source on a per data source basis. The method generally further includes receiving a request to identify any data elements in a data source being accessed by a user that have at least a corresponding global annotation in the annotation database, determining whether the annotation cache contains an entry for the data source; and, if so, returning an indication of the set of global annotations in the annotation cache corresponding to the particular data source being accessed by the user.

Another embodiment provides a computer-readable medium containing an executable component for providing global annotation services. When executed by a processor, performs operations that generally comprise defining a set of data elements for which global annotations may be created, wherein global annotations are stored by an annotation system independently from a representation used by a software application for a particular data element, identifying a data source accessed by a user, and parsing the data source to identify a set of candidate data elements, wherein each member of the set of candidate data appears in the set of data elements for which global annotations may be created. The operations further comprise returning an indication of the members of the set of candidate data elements to the software application program used by the user to access the data source.

Another embodiment provides a computer-readable medium containing an executable component for providing global annotation services. When executed by a processor, performs operations generally comprising identifying a data source accessed by a user, determining whether the data source has an entry in a global annotation cache that identifies the global annotations available for data sources on a per data source basis; and if so, returning an indication of the set of global annotations in the annotation cache corresponding to the particular data source being accessed by the user. The operations generally further comprise returning an indication of the members of the set of annotated data elements to the software application used by the user to access the data source, and otherwise identifying a set of data elements that appear in the particular data source that have at least a corresponding annotation in the annotation database, retrieving a set of annotations from the global annotation database corresponding to the identified set of data elements, updating the annotation cache to reflect the set of global annotations available for data elements identified in the data source; and returning an indication of the set of data elements to the requesting entity.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

Note, however, that the appended drawings illustrate only typical embodiments of the invention and are not, therefore, limiting of its scope, for the invention may admit to other equally effective embodiments.

DETAILED DESCRIPTION OF THE PREFERRED EMBODIMENTS

Figure 1:
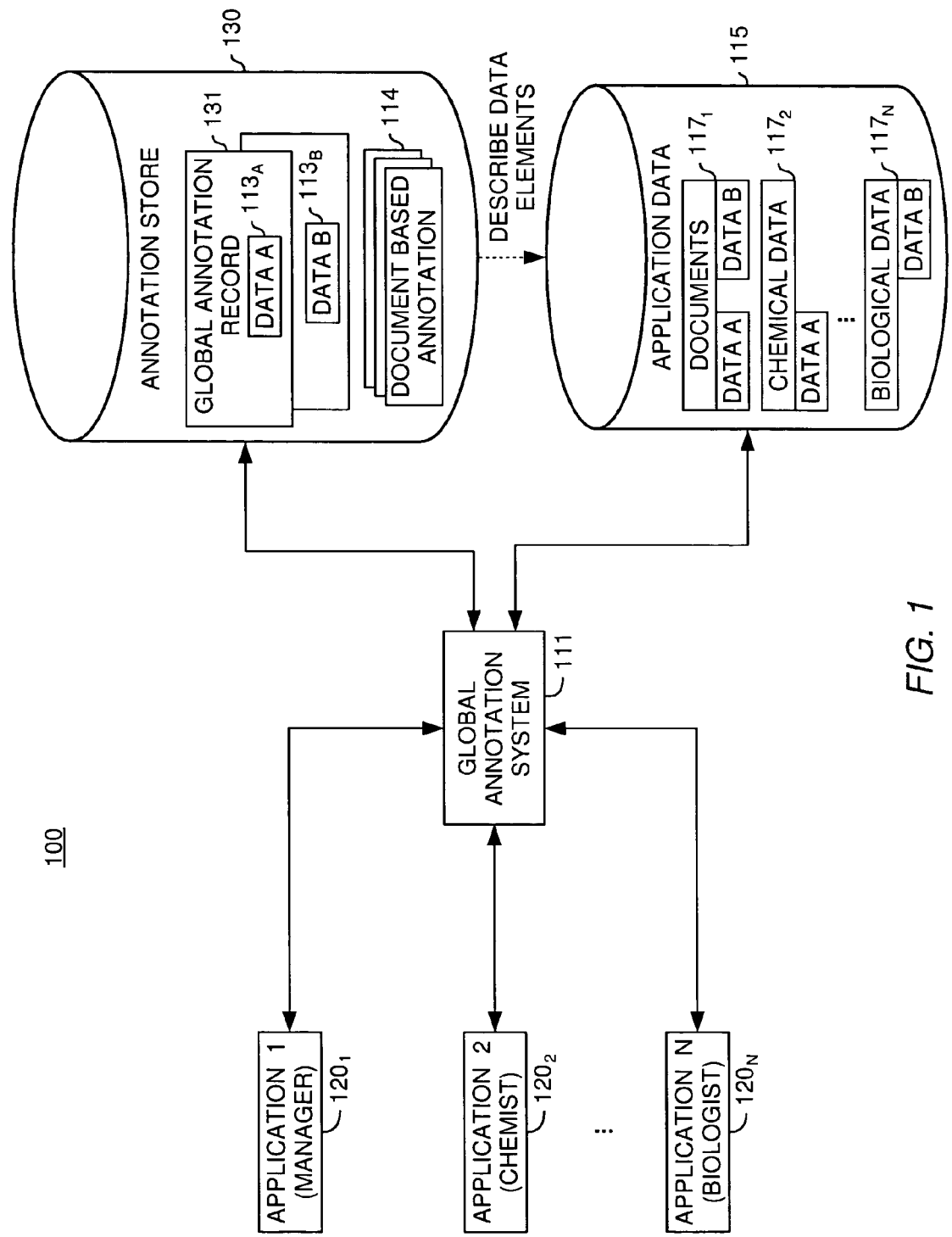
FIG. 1 illustrates an annotation system, according to one embodiment of the invention.

Embodiments of the present invention provide methods, systems, and articles of manufacture that may be used to manage global annotations made for data elements that may appear as part of data manipulated by a variety of software applications. One annotation system may use "document-centered" annotations that are associated with (or "anchored" to) specific documents (e.g., a particular file) or locations within those documents and, therefore, rely on the structure of such documents to define an annotation index for the annotations. In contrast, a global or "data-centered" annotation is associated with the data element it describes. Such an annotation may be stored independently from any particular document format or internal representation used by an application to display the data element. As a result, global annotations are readily accessible across a variety of applications in which the annotated data element appears.

Annotation content captured for both document-based and global annotations may exist in various forms, including textual annotations (descriptions, revisions, clarifications, comments, instructions, etc.), graphical annotations (pictures, symbols, etc.), multimedia (video clips, audio clips, etc.), and the like. While an annotation may exist in all of these forms, to facilitate understanding, embodiments of the invention may be described below with reference to textual annotations as a particular, but not limiting, example. Accordingly, those skilled in the art will understand that the techniques described herein using textual annotations may also be applied to other types of annotation content, and more generally, to any type of reference to a data element.

As used herein, the term "document" generally refers to any data source containing data elements that may be annotated, including, without limitation, text documents, word-processor documents, (e.g., documents created using StarOffice®, WordPerfect®, Microsoft Word®, and the like), spreadsheets programs, database systems, imaging software, digital audio or video files, and the like. Further, as used herein, the term "user" generally refers to any entity using an embodiment of the annotation systems described herein, and may include an individual interacting with an application program, or an application program performing automated tasks. While the following description often refers to a graphical user interface (GUI), it should be understood that in many cases, the same functionality may be provided through a non-graphical user interface, such as a command line and, further, similar information may be exchanged between automated software agents.

One embodiment of the invention is implemented as a program product for use with a computer system such as, for example, the computer system 100 shown in FIG. 1 and described below. The program product defines functions of the embodiments (including the methods) described herein and can be contained on a variety of signal-bearing media. Illustrative signal-bearing media include, without limitation, (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed across communications media, (e.g., a computer or telephone network) including wireless communications. The latter embodiment specifically includes information shared over the internet and other large computer networks. Such signal-bearing media, when carrying computer-readable instructions that perform methods of the present invention, represent embodiments of the present invention.

In general, software routines implementing embodiments of the invention may be part of an operating system or part of a specific application, component, program, module, object, or sequence of instructions such as a script. The software typically comprises a plurality of instructions capable of being performed using a computer system. Also, programs typically include variables and data structures that reside in memory or on storage devices as part of their operation. In addition, various programs described herein may be identified based upon the application for which they are implemented. Those skilled in the art will recognize, however, that any particular nomenclature or application that follows is used for convenience and does not limit the invention for use solely with a specific application or nomenclature. Furthermore, the functionality of programs described herein use discrete modules or components interacting with one another. Those skilled in the art will recognize that different embodiments may combine or merge such components and modules in many different ways.

Further, in the following, reference is made to embodiments of the invention. The invention is not, however, limited solely to any specifically described embodiment; instead, any combination of the following features and elements, whether related to a particular embodiment described herein, is contemplated to implement and practice the invention. Furthermore, embodiments of the invention provide advantages over the prior art. Although embodiments of the invention may achieve advantages over other possible solutions or over the prior art, whether or not a particular advantage is achieved by a given embodiment is not limiting of the invention. Thus, the following aspects, features, embodiments, and advantages are merely illustrative and neither considered elements nor limitations of the appended claims except where explicitly recited in a specific claim. Similarly, references to "the invention" shall not be construed as a generalization of any inventive subject matter disclosed herein and shall not be considered an element or limitation of the appended claims, except where explicitly recited in a specific claim.

An Exemplary Environment

FIG. 1 illustrates an enterprise system 100 that includes a global annotation system 111 that may be used to share information, captured in the form of global annotations 131, between users collaborating on a project, according to one embodiment of the invention. Components of the annotation system 111 described herein may perform in a similar manner to examples described in a commonly owned, co-pending application Ser. No. 10/600,014, entitled "Universal Annotation Management System", and in commonly owned, co-pending application Ser. No. 10/803,619, entitled "Method and System for Creation and Retrieval of Global Annotations" both of which are incorporated by reference herein in their entirety.

Those skilled in the art will recognize that many of the concepts described herein may be integrated and implemented using the techniques taught by these co-pending applications. Furthermore, as described in greater detail below, a single annotation system may be configured to support both "document-centered" annotations global "data-centered" annotations.

As described above, rather than reference a particular document, or location thereof, global annotations 131 are indexed to the substantive data elements they describe. In other words, global annotations 131 are largely "self-describing." in one embodiment, global annotations 131 are defined by the annotation system 111 using eXtensible Markup Language (XML). As those skilled in the art understand, XML is a standardized markup language for describing data.

Global annotations 131 may be accessed from any application 120 configured to interact with the annotation system 111. For example, global annotations may be accessed from a document loaded by first application 120, even when the global annotation was created while viewing another document, or possibly with a second application 120. In other words, discrete occurrences of the same data element 113 may appear in a number of different type data sources 117, and a global annotation 131 may be anchored to the data element instead of each data source in which the data element appears.

As illustrated in FIG. 1, data element $113_A$ (e.g., a gene family name) may occur in both a document $117_1$ and chemical data $117_2$, while another data element $113_B$ may occur in both the document $117_1$ and biological data $117_N$. A global annotation describing data element $113_A$ ("Data A") may be accessed from application $120_1$ used to display "Data A" from document $117_1$, or from application $120_2$ used to display "Data A" from chemical data $117_2$, or any other application capable of loading a source containing data element "Data A." Similarly, a global annotation describing the data element $113_B$ ("Data B") may be accessed from application $120_1$, application $120_N$, or any other application capable of loading a data source containing the "Data B." In addition to the global annotation, data elements in a data source may be annotated with "local" or document-based annotations 133. Such document-based annotations are anchored directly to the data source (and location therein), and not available to instances of the data element appearing in other data sources.

To create a new annotation, a user typically interacts with software components that may be embedded within a particular application (e.g., as a plug-in component), with a stand-alone annotation application or with a web-based application accessed using a web browser. In any case, the global annotations 131 may be stored in a central annotation repository (e.g., an annotation store 130), that contains both the annotation content and references to the data elements they describe. Storing the global annotations 131 in the annotation store 130 captures the tacit knowledge embodied in the annotation without modifying the data source containing the data element corresponding to a particular global annotation. For some embodiments, the annotation store 130 may be searched independently from data sources containing the data elements described by the global annotations 131. Thus, not only are global annotations 131 accessible from any annotation enabled application accessing a data source, they may also be accessed independently from those applications.

Figure 2:
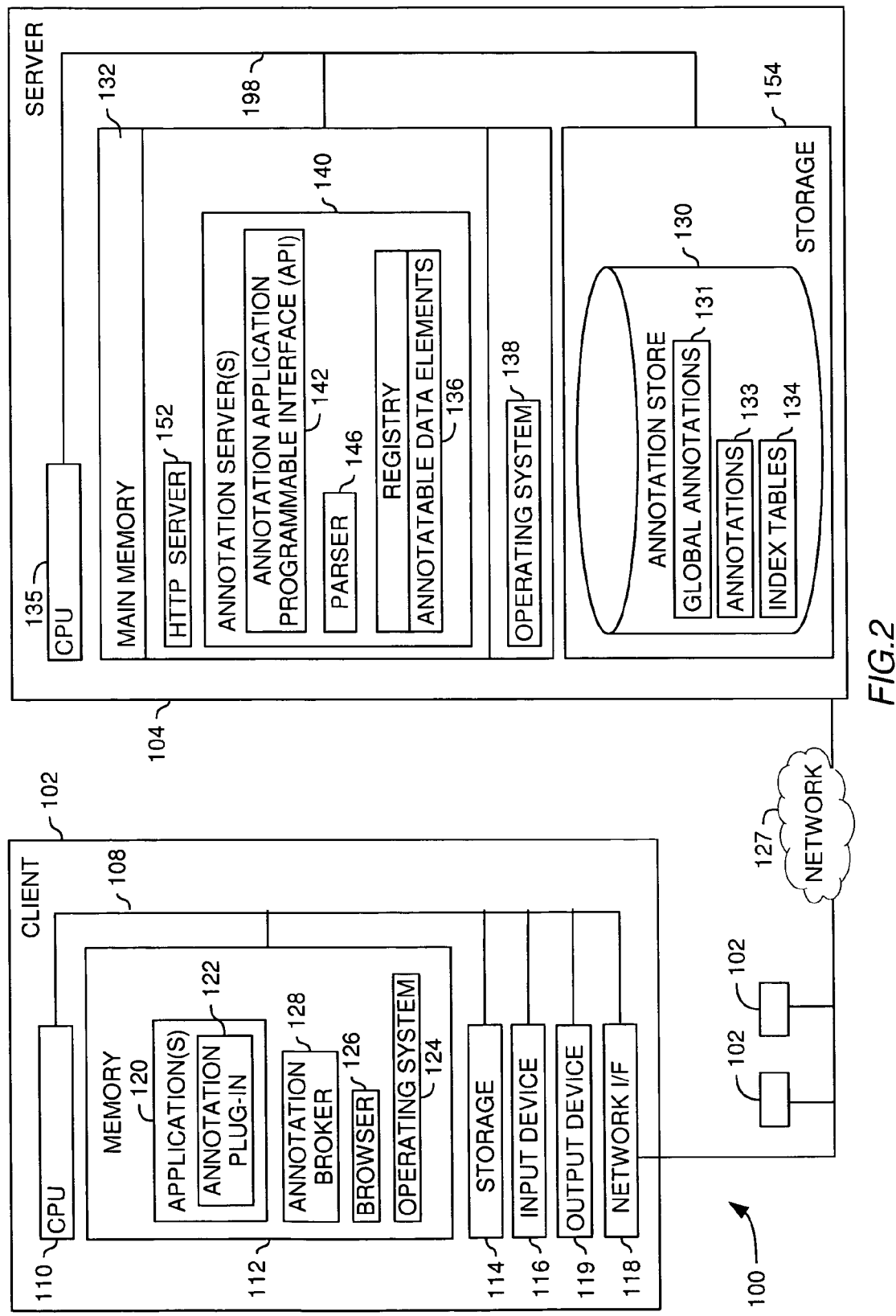
FIG. 2 illustrates a computing environment in which embodiments of the invention may be used.

Referring now to FIG. 2, a client-server view of one embodiment of the enterprise system 100 is shown. As illustrated, the system 100 generally includes one or more client computers 102 (e.g., user workstations) generally configured to access global annotations 131 in an annotation store 130, via the annotation server 140 (e.g., a software component included in annotation system 111) running on at least one server computer 104. The client computers 102 and server computer 104 may be connected via network 127. In general, the network 127 may be any combination of local area networks (LAN), a wide area networks (WAN), wireless networks, or other suitable networks, including the Internet.

Client computer 102 typically includes a central processing unit (CPU) 110 connected via a bus 130 to memory 112, storage 114 and network interface 118. Storage 114 is preferably a direct access storage device such as a IDE, SCSI, or RAID managed hard drive(s). Although shown as a single unit, storage 114 may comprise a combination of fixed and/or removable storage devices, such as fixed disc drives, floppy disc drives, tape drives, removable memory cards, or optical storage. Memory 112 includes memory storage devices that come in the form of chips (e.g., SDRAM or DDR memory modules).

In addition, each of the client computers 102, may include additional components, such as I/O devices 116 and 119 (e.g., keyboard, mouse pointer, CD-Rom, USB devices), and may also include other specialized hardware. Further, each client computer 102 is running an operating system, (e.g., a Linux® distribution, Microsoft Windows®, IBM's AIX®, FreeBSD, and the like) to manage interactions between hardware components and higher-level software applications.

The memory 112 is also shown containing at least one application 120 (optionally shown with an associated annotation plug-in 122 and an annotation broker 128). The application 120 may comprise one of a variety of applications used to manipulate (e.g., create, view, and/or edit) data that may be annotated. For example, the application 120 may be a word processor used to manipulate text based documents, a database application or spreadsheet used to manipulate data, a document viewer (such as Adobe's Acrobat Reader®) used to view PDF documents, or data analysis software, such as Decision Site available from Spotfire, Inc., imaging software used to manipulate images, and any other software application used to manipulate data.

Some application programs 120 may be configured to communicate with the annotation server 140 directly, for example, via a set of application programming interface (API) 142 functions provided for the annotation server 140. An API generally provides set of interface that may be used by a client computer or process to communicate with a server computer or process. Other application programs, however, may communicate with the annotation server 140 via plug-in components 122 and/or the annotation broker 128 (e.g. also via the API 142). In other words, annotation capability may be added to an existing application 120 via the plug-in components 122. The plug-in components 122 may, for example, present graphical user interface (GUI) screens to users of applications 120, thus allowing the creation and retrieval of annotations from within the applications used to manipulate the annotated data.

The annotation broker 128 is an optional component and may comprise a software component configured to define a re-useable interface to the annotation server 140 from various applications 120. The annotation broker 128 may thereby provide a degree of separation between the applications 120 and the annotation server 140, hiding detailed operation of the annotation server 140 and facilitating development of plug-in components 122. In other words, new applications 120 may be supported through the development of plug-in components 122 written according to the interface provided by the annotation broker 128.

The server computer 104 may be physically similar to the client computer 102. Accordingly, the server computer 104 is shown generally comprising a CPU 135, memory 132, and storage device 154, coupled by bus 198. Also, server computer 104, like client computer 102, may include additional components not illustrated in FIG. 1, such as I/O devices (e.g., keyboard, mouse pointer, CD-Rom, USB devices, monitor display and the like), and may also include other specialized hardware. More generally, the client computer 102 and server computer 104 are labeled as such due to their respective function and on the software processes running thereon and not necessarily on any difference in the physical components used to construct each computer system. Thus, server computer 104 is also running an operating system, (e.g., a Linux® distribution, Microsoft Windows®, IBM's AIX®, FreeBSD, and the like) to manage interactions between hardware components and higher-level software applications.

As illustrated, the server computer 104 may be configured with the annotation server 140, also shown residing in memory 132. The annotation server 140 provides annotation clients running on one or more client computers with access to the annotation store 130 using the annotation API 142 or using the annotation broker 128. As used herein, the term annotation client generally refers to any user interface that communicates with the annotation server 140 to manipulate (e.g., create, update, read and query) annotation data. As described above, examples of annotation clients include applications 120 communicating with the annotation server 140 directly, or via plug-in components 122 and includes a browser-based interface to the annotation server 140 using an annotation browser 126.

The annotation server 140 may be configured to perform a variety of operations, such as responding to requests to create annotations for a specified data element, formulating and issuing queries against the annotation store 130, to search for annotations for a specified data element, and formulating and issuing queries against the annotation store 130 to search for annotations satisfying one or more specified conditions (e.g., having a specified author, creation date, content, and the like). In one embodiment, the annotation server 140 is extended to enable global annotations using a parser component 146 and a registry component 136. The parser component may be a software component configured to inspect a set of input data (e.g., a document) and identify candidates for global annotations. That is the parser may identify data elements that have an existing global annotation 131, or that may serve as a data element for a new global annotation 131. The annotation registry 136 may be used to store (and later identify) the data elements that do, in fact, have an existing global annotation stored in annotation store 130.

As described above, the annotation server 140 may allow a user to access both global annotations 131 (anchored to data elements) and document-centered annotations 133 (e.g., anchored to documents or locations therein), which may be stored in the same annotation store 130.

A Relational View of the Annotation System

Figure 3:
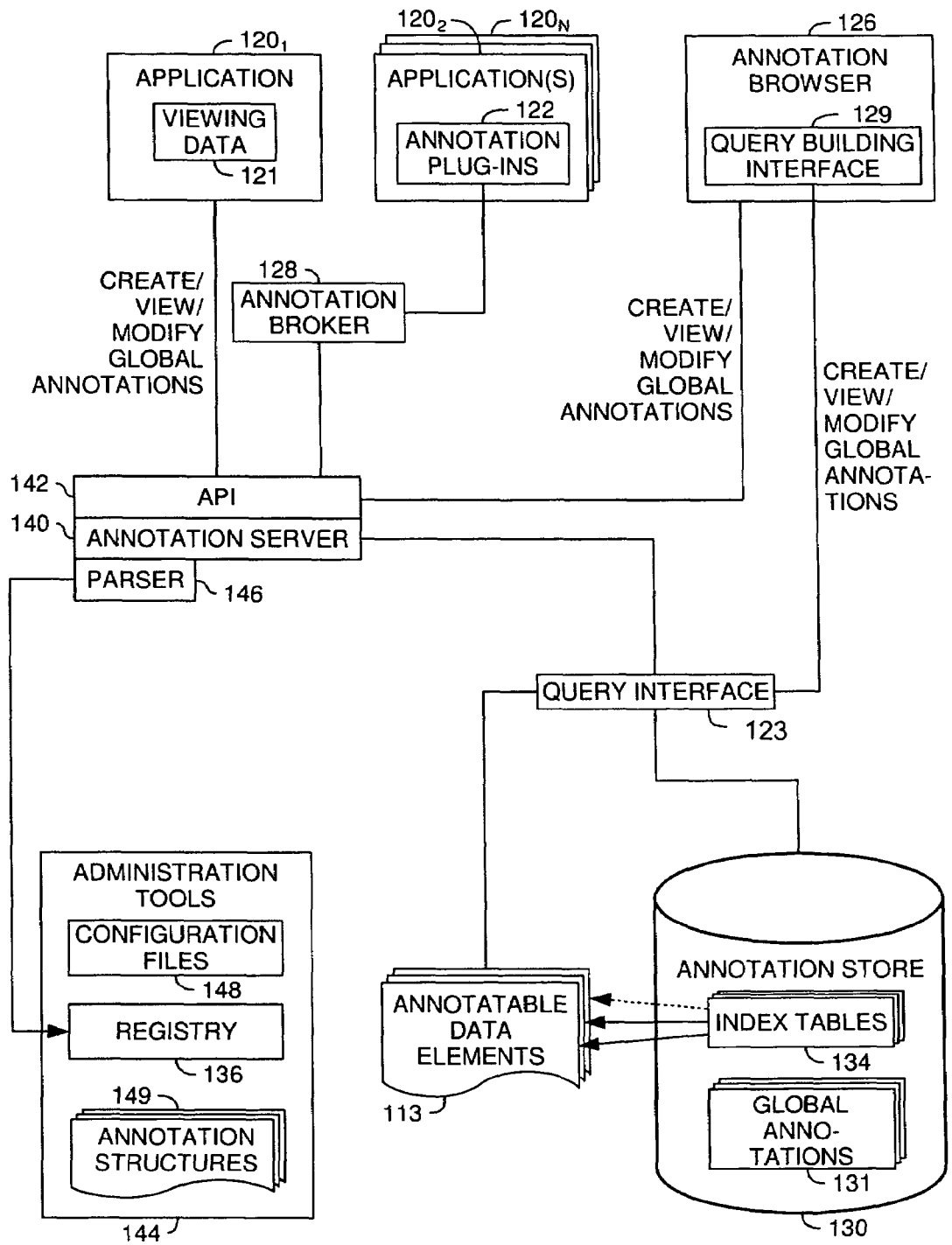
FIG. 3 is a relational view of an annotation system, according to one embodiment of the invention.

FIG. 3 illustrates a relational view of the annotation server 140 and other components of an annotation system, according to one embodiment of the invention. As described above, one or more applications 120 (e.g., residing on one or more client computers 102) may communicate with the annotation server 140 directly (e.g., application 120$_1$) or via the annotation plug-ins 122 or through annotation broker 128 (e.g., applications 120$_2$-120$_N$), to create and view global annotations anchored to data elements contained in data source 121 loaded by the applications 120. In some cases, to retrieve global annotations, or to create global annotation records 131, the annotation server 140 may issue queries against the annotation store 130 via a query interface 123.

As illustrated, the annotation broker 128 may serve as an interface between annotation plug-ins 122 and the annotation server 140. For example, the annotation broker 128 may manage messages sent to and from multiple annotation plug-ins 122 and the annotation server (e.g., mediating between multiple plug-in components 122 attempting to access the annotation server 140 simultaneously). For some embodiments, the annotation broker 128 may be implemented as a Windows Component Object Model (COM) server or a CORBA server, either of which may be used to provide a standard interface to the annotation server 140 for annotation plug-ins 122. In other words, the annotation broker 128 may comprise an object request broker that provides an interface for communication between applications 120 (and plug-ins 122) and the annotation server 140. Providing a common interface may encourage extension of the annotation system 111 to support new applications 120 through the development of plug-in components written configured to communicate with the interface supplied by the annotation broker 128.

An annotation browser 126 may be configured to allow a user to view both application data and annotations, independently from the applications 120. For some embodiments, the annotation browser 126 may provide a web-based interface for viewing structured data content (e.g., application source data that can be rendered by the annotation browser using a MIME type). Annotation browser 126 may be further configured to retrieve and display annotations via the query interface 123. The web-based interface may allow a user to compose and execute queries (e.g., using HTTP get and post transactions with HTTP server 152). Thus, the annotation browser 126 may allow global annotations to be accessed, searched or queried, independently from applications 120.

For some embodiments, an index, or set of indexes, may be used to identify annotated data elements may be stored with the annotation content of a global annotation. In one embodiment, an index obtained from an annotation record may be used to retrieve information from one or more index tables 134. The retrieved information may identify a particular data element 113 appearing in a particular data element 117.

After retrieving a global annotation record 131 from the annotation store 130, using the index stored therein, the data element described by the annotation can be found from the information within the annotation record. Conversely, annotations for a given data element may be identified based on an index or other type value generated from the data element, for example, using a one-way hash function. In any case, the indexes identify annotated data elements and may be used to query an annotation store for global annotations associated with an annotated data element.

Global Annotation Processing

Different applications 120 may use different internal representations to represent an annotatable data element 113. Accordingly, in some embodiments, an annotatable data element 113 may be normalized by the annotation server 140 into a common form. In one embodiment, annotatable data elements are processed to remove any tags, markup, or other metadata added by a particular application, reducing the data element to a common text string that may be associated with the data element, regardless of the application 120 in which it appears. Also, non-text objects, such as images or audio recordings, may be "textified" (i.e., reduced to a simple, unformatted text representation) using any information available. For example, "alternate text" included with an image may be used represent an annotatable data element 113. Also, object names such as image names, graph titles, and file names may be used to represent objects using a text string. Another example includes using key information from diagrams, maps, or other graphic representations that may be extracted and placed into a text form using optical character recognition techniques. In one embodiment, the normalization process is performed by a client application 120 configured to communicate directly with the annotation system 111. Alternatively, or in addition, a plug-in component 122 integrated with a particular application 120 may be used to perform the normalization process.

In one embodiment, in addition to normalizing the data element, information that identifies an instance of the data element in a particular data source is included in the annotation. For example, the data element 113 may include location coordinates from the original data source used to locate the data element within the original data source. Because a particular data element may appear in multiple data sources, over time, the global annotation may become associated with multiple location coordinates for the data element 113, thereby creating a list of mappings between the global annotation 131 and the corresponding data element 113 in multiple data sources. Thus, the performance of the annotation system 111 may be improved by maintaining location information with the global annotations.

For some embodiments, the index table 134 may be queried separately to determine whether annotations exist for a specified data element. This information may be used to provide an indication (e.g., an icon) in the application program 120 of data elements 113 that have global annotations. In other words, the existence of an index value for a data element in the index table 134 indicates an annotation has been made for that data object. As described in greater detail below, for some embodiments, actual annotations are not retrieved until a user requests them, for example, by clicking on a corresponding annotation icon with a mouse.

For some embodiments, the annotation server 140, and related components, may be configured via a set of administrative tools 144. The administrative tools 144 may be used to create, edit, and modify a registry 136 containing a list of annotatable data elements. For example, the administrative tools 144 may allow users to define new annotatable data elements 113 to be added to the registry 136. The registry 136 may identify a set of annotatable data elements 113 and may be organized in any suitable manner, for example, by families or categories of annotatable data elements.

For some embodiments, a parsing component 146 may receive data from a data source, parse the data, and query whether the registry 136 has any entries that match the parsed data. The parser 146 may return a list of data elements to application 120 that represent candidates for global annotations (e.g., data elements to which global annotations may be anchored). The parser 146 may also use the parsed data to query existing set of global annotations to identify global annotations available for data elements that appear in the data source. Note, this allows a global annotation to be identified for a data element that was created from any data source in which the particular data element appears.

The global annotation system 111 may be configured to optimize the performance of the annotation system 111 when enabling global annotations. First, a user profile may indicate whether global annotations are enabled, or identify a subset of global annotations that are active for a particular user. In one embodiment, 146 a subset of annotations may be determined from a dictionary of interesting terms maintained for a user (or group of users). Alternatively, a user may specify search terms to include (or prohibit) when selecting a cross-section of candidate data elements. Using this subset, the annotation server 140 may retrieve annotations only for the data elements that a user desires to view.

Additionally, the timing of global annotation identification and retrieval may affect overall performance of the system. In one embodiment, a user may choose to engage in a "work while I view" process to retrieve global annotations, and may choose to see all the possible matching terms without actually retrieving the corresponding annotations (if any exist). In another embodiment, the system 111 may choose a "lazy" approach, identifying and retrieving annotations for data elements only when requested. In a large annotation repository this method is effective, because the probability that particular data element has been annotated by a global annotation increases with the size of the repository. Moreover, a user may often be correct in assuming that a data element has an associated global annotation. That is, when a data element is interesting to one user, it is likely to be interesting to others.

In one embodiment, the annotation server may be configured using multi-threaded programming techniques. This allows an application 120 (or plug-in component 122 integrated into application 120) to simultaneously display a document (processed by a viewing thread), parse other portions of the document to identify annotation candidates (processed by a parsing thread), and to retrieve an annotation for display (processed by a retrieving thread).

Also, once established, an annotation registry is reasonably static. Thus, a cache of annotations may be stored for a particular data source. A cache of global annotations mimics the behavior of document-based annotations. By maintaining a cache of the global annotations available for data elements that appear in a specific document, so long as the document does not change, then the global annotations cached for a particular document may be provided to a user. This avoids the process of repeatedly converting document content to a normalized form and searching for interesting data elements or terms. Instead, the annotation server can readily return information from the cache. If the document has changed, (or if it is new) then the complete process is executed and the cache is renewed (or created). In one embodiment, persistent cache information for a specific document may be maintained in a database.

Operational Methods

Figure 4:
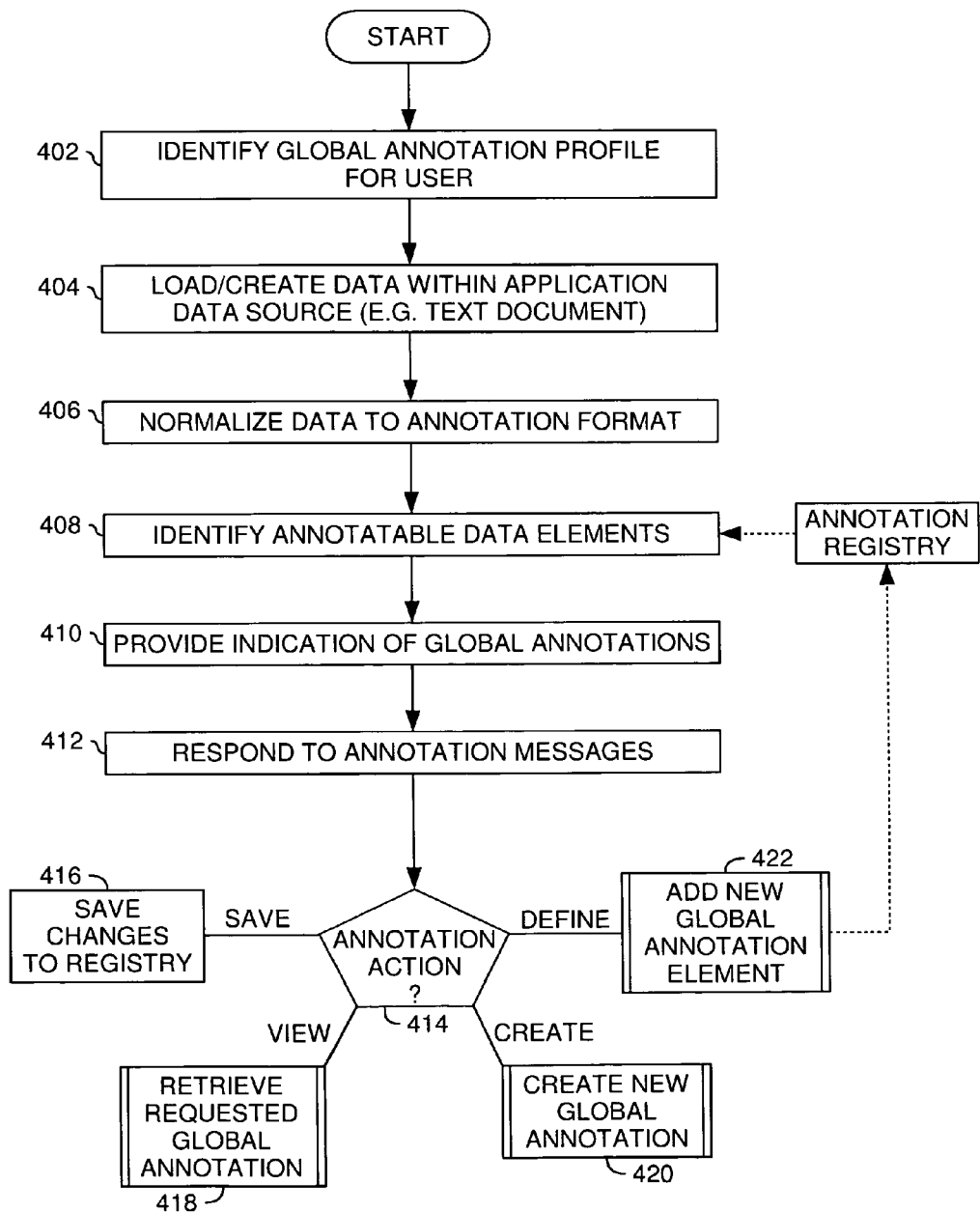
FIG. 4 is a flow diagram of operations for managing an annotation system, according to one embodiment of the invention.

FIG. 4 is a flow diagram of operations 400 for managing an annotation system, according to one embodiment of the invention. At step 402, an annotation system 111 may identify a profile for a particular user, or for a particular application 120. An annotation profile may comprise a set of rules used to identify which global annotations, or annotatable data elements 113, may be of interest to a particular user. Profiles may be defined per user, class of users, per document type, etc. In one embodiment, this includes a dictionary of terms identifying a list of interesting terms (and common variations thereof for a user, or group of users. Using a profile or dictionary allows users to restrict the number of global annotations retrieved for a particular document (or indications thereof) by recent use, by number of annotations per data element, by annotation size or by other parametric conditions. In this manner, as described above, a user can access a relevant subset of the complete universe of global annotations stored in the annotation store 130. Furthermore, by allowing a user to restrict the universe of global annotations, performance of the system is improved by not processing annotations that a user is not interested in viewing, and the quality global annotations actually provided to a particular user is increased.

At step 404, a user interacting with application 120 loads or creates a data source that may include one or more annotatable data elements 113. For example, the user may open an existing text document using a word processor, or create a new document using the word processor. In one embodiment, the application 120 (or plug-in 122) may provide a user with a method to request the annotation system 111 to identify any data elements within the data source for which there exists a corresponding global annotation, or which exist as an annotatable data element identified by the registry. For example, a GUI control button, like the one illustrated by FIG. 7A, may be used to provide access to annotation services. In an alternative embodiment, globally annotated data elements may be identified each time a user initially accesses a data source.

At step 406, the relevant application data is provided to the annotation server 140 and normalized into a text form (or other unique form to identify data elements across different application types) as described above. Alternatively, an annotation plug-in 122 may be configured to normalize the data into a form required by the annotation server 140. At step 408, the annotation server 140 may identify data elements appearing in the data source for which there exist corresponding global annotations 150 in the annotations store 130. In one embodiment, an annotation cache may be configured to store the global annotations that exist for data elements in a specific document. If the document is in the cache, then annotation server 140 may skip step 406 and use the annotation cache to identify annotations stored for the data source.

At step 410, the annotation server 111 may be configured provide an indication of data elements with global annotations, and identify data elements that may serve as a candidate for new global annotations. For example, an icon may be displayed adjacent to a data element, or a data element may be rendered using a different font or using bold or italic text formatting. In addition, data elements with existing annotations may also be similarly indicated using text formatting techniques or a display icon. For example, in FIG. 7A illustrates data elements with a dashed box, and annotated data element with an icon display. If an annotation icon is displayed adjacent to a data element, an annotation icon may comprise an image displayed for an anchor tag in an HTML document like the following:

```
<A href=http://annotations.ibm.com/retreive_global.php?index=1729/>
<IMG SRC=icon.gif" WIDTH="15" HEIGHT="15" BORDER="0">
</A>
```

This way, the annotation ID, 1729 in this example, is encoded into the display of the document. Doing so simplifies the annotation retrieval process and improves the efficiency of the annotation system 111.

At step 412, as a user interacts with an application 120, the application server 140 (or application plug-in 122) may be configured to carry out annotation actions in response to user activity (step 414). For example, in one embodiment, annotation actions may include a request to save any changes made to the annotation registry (step 416), to retrieve and display a particular global annotation (step 418), to create a new global annotation for a data element (step 420), or to add a new data element to the set of annotatable data elements 113. In one embodiment, the set of annotatable data elements 113 are maintained in the registry 136. Alternative embodiments may implement all, some, or other annotation actions similar to the ones illustrated in FIG. 4.

Figure 5:
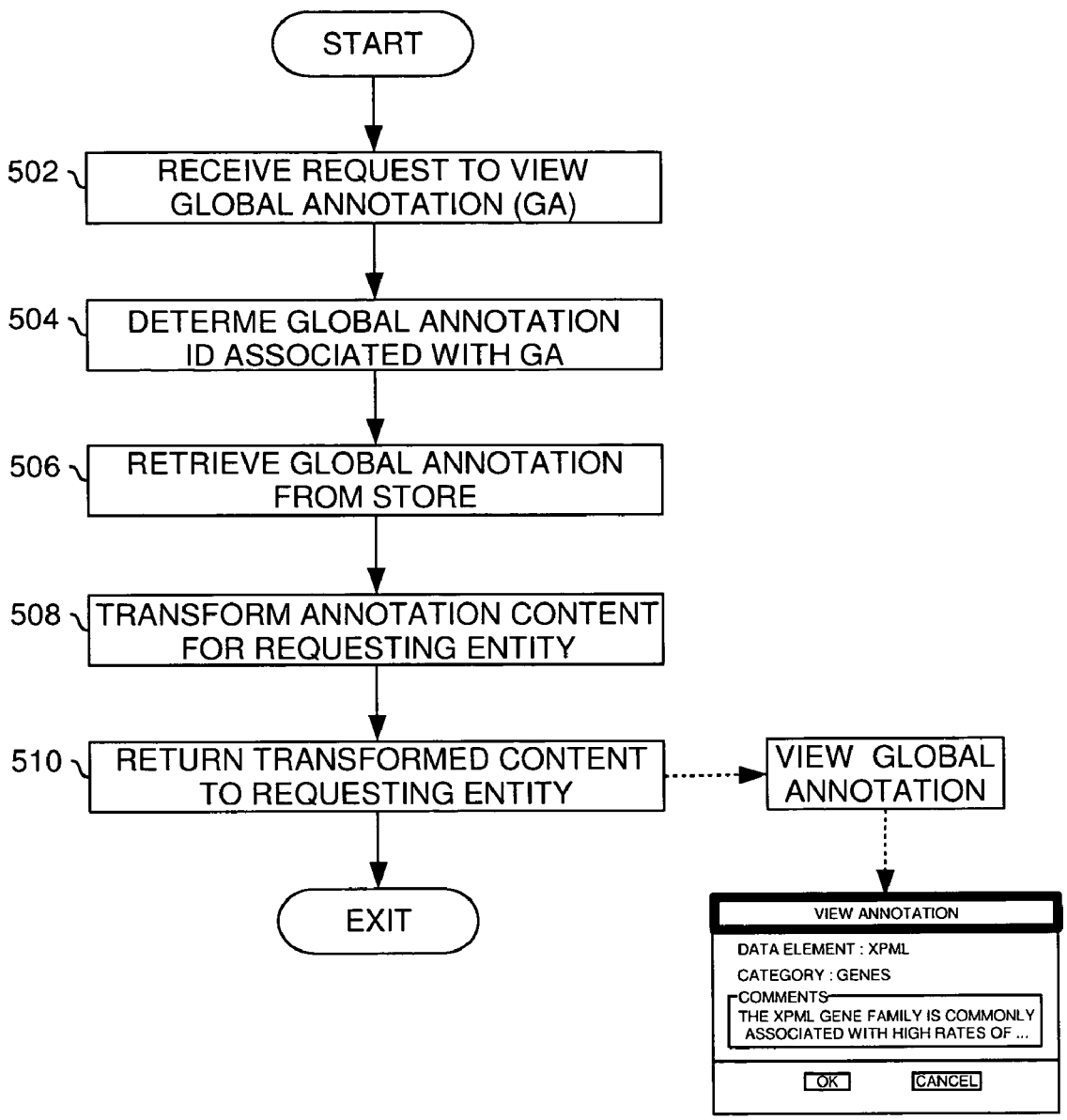
FIG. 5 is a flow diagram of operations for retrieving and viewing global annotations, according to one embodiment of the invention.

FIG. 5 is a flow diagram of operations 500 performed in response to a request (e.g., a user manipulating application 120) to retrieve and view a global annotation, according to one embodiment of the invention. At step 502, the annotation server 140 receives a request to retrieve a global annotation. A request may be generated in response to a user clicking on an annotation icon displayed adjacent to an annotated data element appearing in a data source. At step 504, the annotation server 140 determines the global annotation ID corresponding to the global annotation record 150 being requested, such as the normalized text string described above. Alternatively, an annotation icon, or other indication of the global annotation, may store a corresponding annotation ID. When a data source is parsed to identify data elements 113 with corresponding global annotations, the ID for the annotation may be saved or returned to the requesting application, without retrieving the actual annotation content for each identified annotation.

In addition, the annotation ID may be used to distinguish between global annotation records 150 and document-based annotations. For example, a document-based annotation ID may identify the document by its location using a uniform resource locator (URL), and a set of coordinates within a particular resource. This distinction may be used by the annotation server 140 and application 120 (and plug-ins 122) to determine how to display the global annotation record 150.

At step 506, after a particular global annotation record 150 has been identified the annotation server 140 retrieves the global annotation record from the annotation store 130. As retrieved, the annotation content included in global annotation record 150 may need to be formatted for the requesting application 120. Accordingly, at step 508, the annotation content is formatted for the requesting application as needed and returned to the requesting application at step 510. In one embodiment, an annotation plug-in 122 is configured to process the global annotation content into a form consistent with the form used by the corresponding application 120. After being returned, application 120 renders the annotation content using one or more graphical user interface screens or is otherwise presented to the user.

Figure 6:
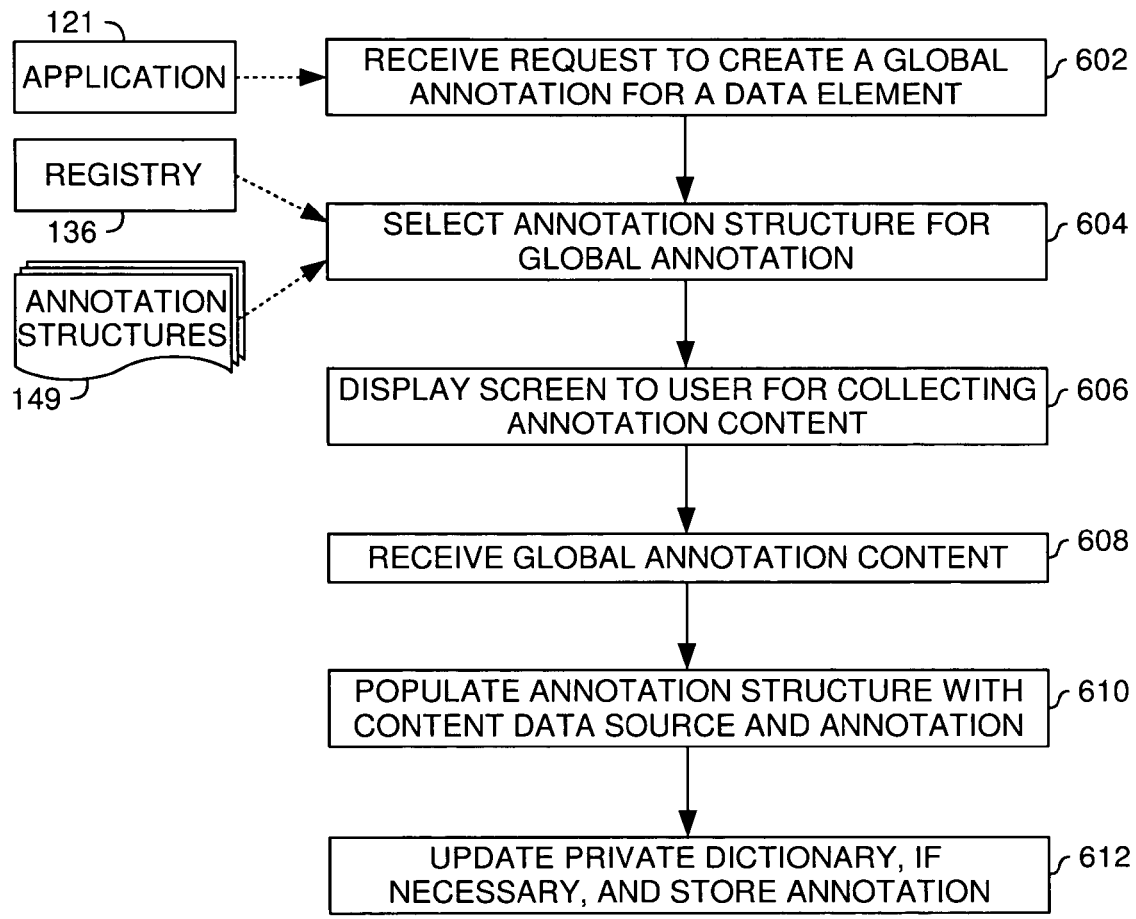
FIG. 6 is a flow diagram of operations for creating global annotations, according to one embodiment of the invention.

FIG. 6 is a flow diagram of operations 600 for creating global annotations, according to one embodiment of the invention. The operations 600 begin at step 602 after annotation server 140 receives a request to create an annotation for a data element.

At step 604, the annotation server selects an annotation structure 149 for the annotation to be created. In some embodiments, the annotation server 140 must select between a global and document-based annotation structure for a particular request. Annotation structures 149 define the format for a particular annotation. Document-based annotations may use an annotation structure consistent with the application 120 being used to create a new annotation. That is, metadata associated with the data element being annotated may refer to the data source and location for the data element. A user profile and configuration files 148 (illustrated in FIG. 3) may define a set of rules for selecting between global and document-based annotation structures 149.

If global annotations are enabled for a user, and the selected term, phrase, or object being annotated matches one already in the registry, then the global annotation structure may be assumed. In one embodiment, if a global annotation structure is retrieved, a user may be allowed to override it. For example, a GUI screen (like the one illustrated in FIG. 8B) displaying an annotation template based on the selected annotation structure, may include a drop-down box containing a list of alternative annotation structures.

In addition, if the user is presented with a document-based annotation structure for the selected data element, the user may be allowed to override this selection and create a global annotation record 150. In such an embodiment, a global annotation is created and the selected term, phrase, or object is added to the registry and the set of annotatable data elements 113 is updated to include an element corresponding to the data element. Alternatively, the new data element may be added only to the user's profile or private dictionary. This allows a user to add interesting terms included in the registry with a set of global annotation data elements unique to that particular user. Prior to being added to the registry (or user dictionary), the data element may first require normalization (e.g., to a simplest text form) before being stored as a new member of the set of annotatable data elements 113. Further, in an embodiment that enables caching, the annotation cache for the data source may also be updated to include the new global annotation.

Once the global annotation structure is selected, a GUI screen displaying an annotation template may be displayed to a user. At step 608, a user interacting with the application 120 may enter annotation content for the selected data element 113. After a user is satisfied with the annotation content, the new content is stored as a new record in the annotation store (e.g., by clicking on a "save annotation" button included in a GUI screen display like the one illustrated in 8B). At step 610, the annotation content provided by a user may be used to populate a new global annotation record 150. If the data element selected for annotation is not in the global annotation registry, it is added at step 612.

Figure 7:
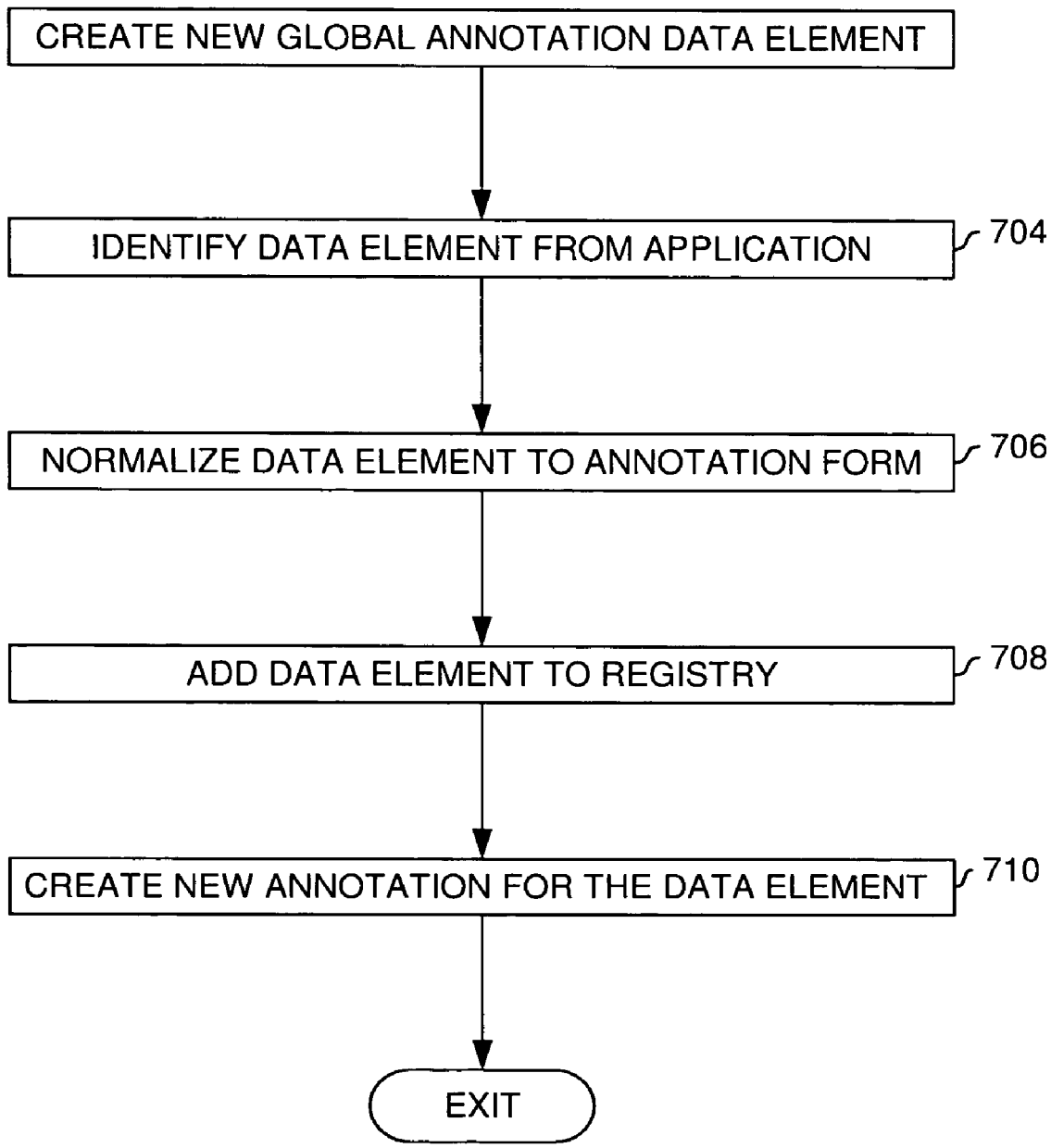
FIG. 7 is a flow diagram of operations for adding a data element to a registry of data elements, according to one embodiment of the invention.

FIG. 7 is a flow diagram of operations 700 for adding data elements to the registry of global annotation data elements, according to one embodiment of the invention. The operations 700 begin at step 704 where a user identifies a data element appearing in an application 120 that a user wishes to add to the set of annotatable data elements 113. Once identified, the data element is normalized into a global annotation format according to the techniques described above (step 706). Once in a normal form, the new element is added to the registry storing the set of annotatable data elements 113 (step 708). Optionally, at step 710, a user may wish to create a new annotation for the data element just added to the registry. Accordingly, the annotation system 111 may initiate operations 600 to create a new global annotation. Alternatively, only some users (e.g., system administrators) may be permitted to modify data elements included in the registry. Accordingly, in some embodiments, new data elements are added to a dictionary associated with a particular user.

FIGS. 8A-8E illustrate exemplary graphical user interface (GUI) screens that illustrate embodiments of some aspects of the present invention. It should be understood, however, that details of the exemplary GUI screens shown in FIGS. 8A-8E are provided for illustrative purposes, and a wide variety of other type GUI screens providing similar functionality may also be used.

Figure 8A:
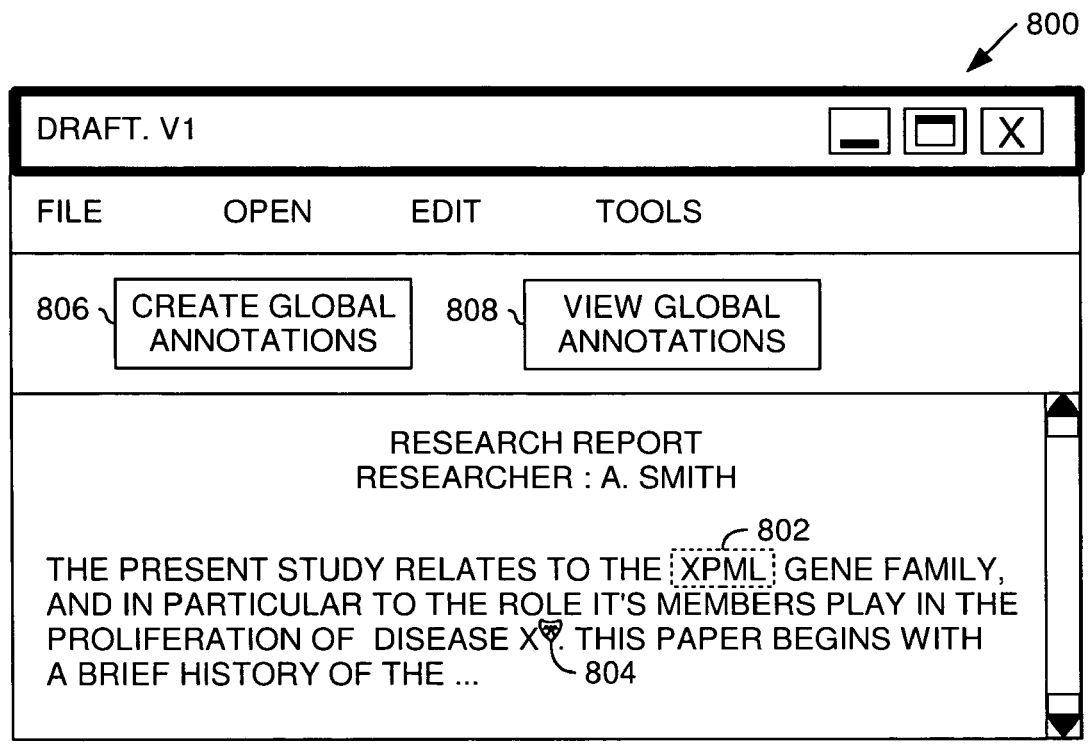
FIGS. 8A-8E illustrate exemplary graphical user interface (GUI) screens according to one embodiment of the invention.
Figure 8B:
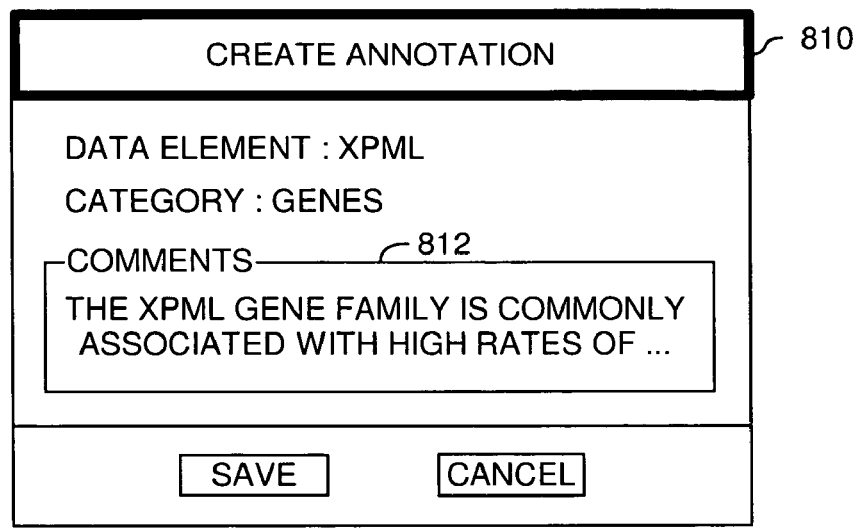

FIGS. 8A illustrates an exemplary screen 800 of a text editor used to edit a sample research report. For various reasons described above, it may be desirable to capture various information about certain data elements contained in the research report and capture that information as a global annotation, allowing the information captured in an annotation to travel with the data element and to be accessed from other applications instantiating the same data element.

As illustrated, data element 802 (gene family) is indicated, the dashed boxes around the text. For some embodiments, annotatable data elements may be automatically identified and highlighted when data is accessed (e.g., when a document is loaded by application 120) by parsing the data and searching the registry or annotation cache as describe above. For some embodiments, different categories of annotatable data elements may exist. Such different categories may be indicated, for example, by different color highlighting facilitating identification of the different categories. Also, an annotation icon 804 may be used to indicate whether an annotatable data element, has, in fact, any corresponding annotations in the annotation store 130.

As shown, the screen 800 includes "Create" and "View Global Annotations" buttons 806 and 808. These buttons may be provided as part of an annotation plug-in for a word processor that allows a user to create and view global annotations. For example, in response to selecting one of the annotatable data elements 802 or 804, and pressing the Create Global Annotations button 706, a user may be presented with the GUI screen 810 shown in FIG. 8B.

As illustrated, GUI screen 810 identifies the data element 113 being annotated (and an optional category), and allows a user to enter annotation content in one or more fields, such as the comment field 812. As previously described, for some embodiments the exact fields may be determined by an annotation structure used to generate the GUI screen 820. In some cases, the GUI screen 810 may also allow a user to select whether the annotation being created should be global (anchored to the data element) or document-based (anchored to the application or data source).

Figure 8C:
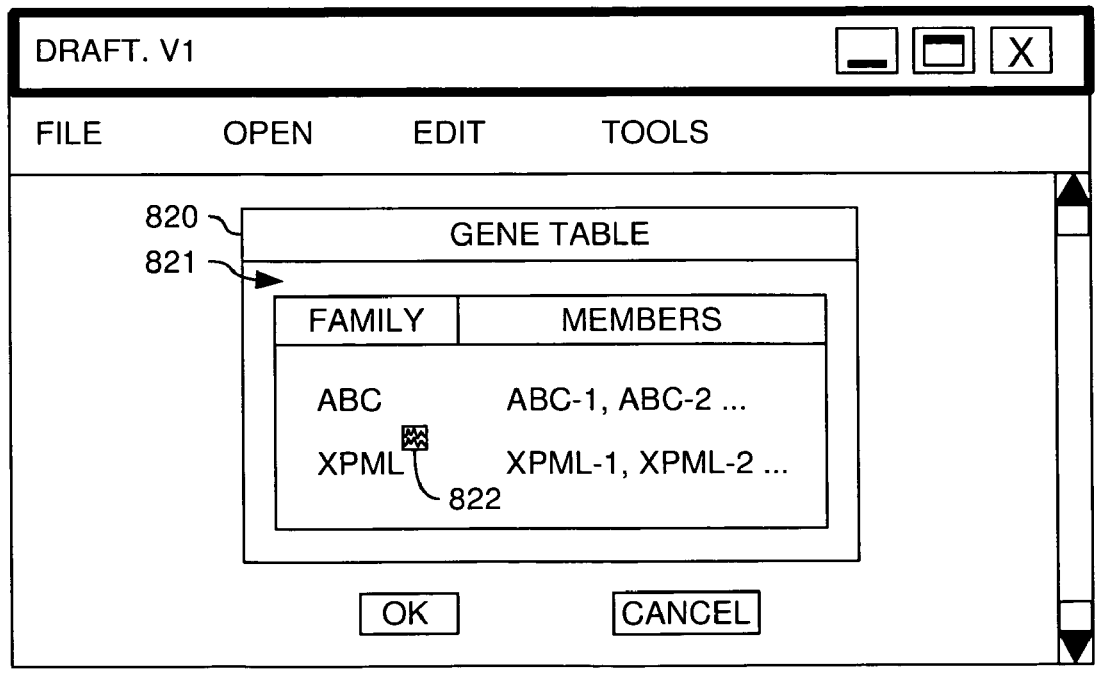
Figure 8D:
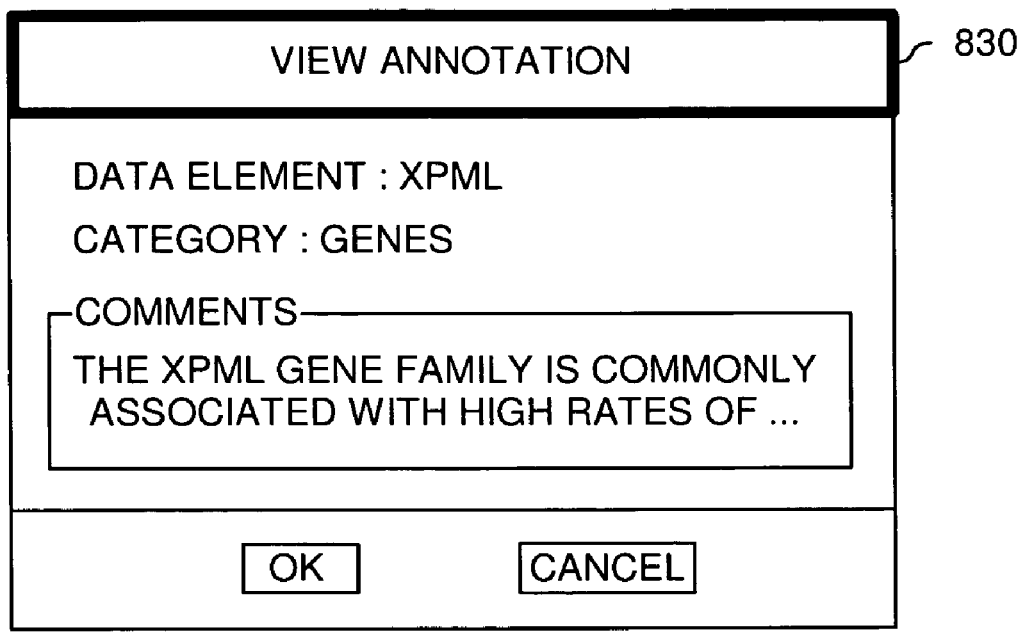

Once created, a global annotation for the data element 802 may be viewed from another application. For example, FIG. 8C illustrates an exemplary GUI screen 820 of a database application (illustratively entitled GeneView) that has instantiated the data element 802 in a table 821. As illustrated, an annotation icon 822 may be displayed adjacent to the data element 802 to indicate the existence of the global annotation. In response to clicking on the annotation icon 822, the previously created global annotation may be displayed in the GUI screen 830 shown in FIG. 8D.

Figure 8E:
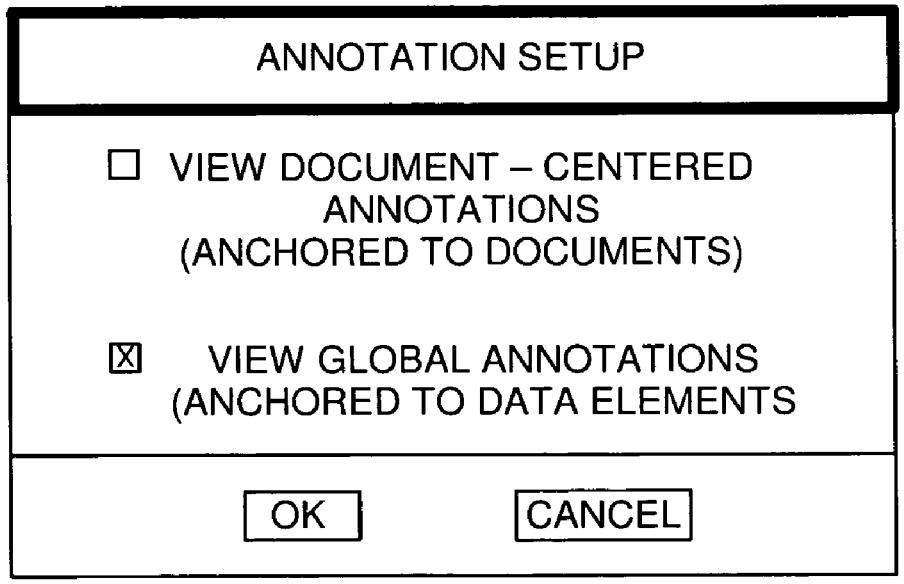

As described above, for some embodiments, in addition or instead of global annotations anchored to data elements, document-centered annotations anchored to documents or locations therein may also be created and/or viewed from the same application. FIG. 8E illustrates an exemplary GUI screen that allows a user to select which type of annotations to display. As described above, for some embodiments, users may be given more specific viewing control, for example, to specify particular categories of data elements for which global annotations should be viewed. Such control may be desirable as the total number of global annotations corresponding to data elements in any particular set of loaded data may grow large over time.

CONCLUSION

Global annotations allow users to capture tacit knowledge about data elements. This knowledge may be shared with others regardless of what application is used to view a data source that contains data element annotated with a global annotation. As such, global annotations are anchored to the data element they describe, thereby facilitating a more global sharing of information While the foregoing is directed to embodiments of the present invention, other and further embodiments of the invention may be devised without departing from the basic scope thereof, and the scope thereof is determined by the claims that follow.

What is claimed is:

1. A computer-implemented method for managing global annotations for data elements present in a data source comprising:

defining a set of data elements capable of being annotated with a global annotation, wherein each global annotation is stored by an annotation system independently from a representation used by a plurality of software applications to represent a particular data element;

identifying the data source accessed by a user, wherein the data source includes a plurality of data elements;

parsing, by the annotation system, the data source to identify a set of candidate data elements from the plurality, wherein parsing the data source to identify a set of candidate data elements comprises transforming the data elements appearing in the data source to a normalized form used by the annotation system to identify data elements independently from a representation used by a software application for a particular data element and comparing the normalized data elements with the set of data elements capable of being annotated with a global annotation, and wherein each member of the set of candidate data also appears in the set of data elements capable of being annotated with a global annotation;

returning an indication of the members of the set of candidate data elements to the software application;

receiving, from one of the plurality of software applications, a request to create a global annotation for one of the candidate data elements;

selecting an annotation structure that defines a set of fields required to create the global annotation;

obtaining annotation content for a new global annotation;

populating the annotation structure with the annotation content; and storing, by the annotation system, the created global annotation in the normalized form for the candidate data element.

2. The method of claim 1, returning an indication of the members of the set of candidate data elements comprises providing, to the software application used to access a data source, data content capable of being rendered for display by the software application.

3. The method of claim 2, wherein the data content is HTML data content rendered by an internet web-browser application.

4. The method of claim 1, wherein the set of data elements capable of being annotated with a global annotation comprises data elements taken from a dictionary of terms maintained for a particular user and data elements taken from a registry of terms maintained for the annotation system.

5. The method of claim 1, wherein defining a set of data elements comprises adding a new data element to the set of data elements capable of being annotated with a global annotation the first time a global annotation is created for a particular data element.

6. The method of claim 1, wherein obtaining annotation content comprises providing, to the requesting entity, data content capable of being rendered for display by the software application.

7. The method of claim 6, wherein the data content is an HTML document transmitted to the requesting entity and rendered by an internet web-browser application.

8. The method of claim 1, wherein the data source accessed by a user occurs each time a user accesses the data source.

* * * * *